US011911903B2

(12) United States Patent
Duan et al.

(10) Patent No.: US 11,911,903 B2
(45) Date of Patent: Feb. 27, 2024

(54) SYSTEMS AND METHODS FOR ROBOTIC PICKING AND PERTURBATION

(71) Applicant: Embodied Intelligence, Inc., Berkeley, CA (US)

(72) Inventors: Yan Duan, Berkeley, CA (US); Ian Rust, San Francisco, CA (US); Andrew Amir Vaziri, Lutherville, MD (US); Xi Chen, Berkeley, CA (US); Carlos Florensa, Berkeley, CA (US)

(73) Assignee: Embodied Intelligence, Inc., Emeryville, CA (US)

( * ) Notice: Subject to any disclaimer, the term of this patent is extended or adjusted under 35 U.S.C. 154(b) by 285 days.

(21) Appl. No.: 17/014,194

(22) Filed: Sep. 8, 2020

(65) Prior Publication Data

US 2021/0069903 A1    Mar. 11, 2021

Related U.S. Application Data

(60) Provisional application No. 62/897,428, filed on Sep. 9, 2019, provisional application No. 62/897,282, filed on Sep. 7, 2019.

(51) Int. Cl.
*B25J 9/16* (2006.01)
*B25J 15/06* (2006.01)

(52) U.S. Cl.
CPC .............. *B25J 9/163* (2013.01); *B25J 9/161* (2013.01); *B25J 9/1697* (2013.01);
(Continued)

(58) Field of Classification Search
CPC . B25J 9/163; B25J 9/161; B25J 9/1697; B25J 15/0658; G05B 2219/39508;
(Continued)

(56) References Cited

U.S. PATENT DOCUMENTS 10,906,188 B1    2/2021    Sun et al.
11,097,418 B2    8/2021    Nagarajan et al.
(Continued)

FOREIGN PATENT DOCUMENTS

WO    20190109336    6/2019

OTHER PUBLICATIONS

Eitel, A., et al., "Learning to Singulate Objects using a Push Proposal Network", arXiv, Feb. 5, 2018 (Year: 2018).*
(Continued)

*Primary Examiner* — Abby Y Lin
*Assistant Examiner* — Karston G. Evans (57) ABSTRACT

Various embodiments of the present technology generally relate to robotic devices and artificial intelligence. More specifically, some embodiments relate to a robotic device for picking items from a bin and perturbing items in a bin. The robotic device may include one or more picking elements and one or more perturbation elements for disturbing a present arrangement of items in the bin. In an exemplary embodiment, a perturbation element comprises a compressed air valve. In some implementations, the robotic device may also include one or more computer-vision systems. Based on image data from the one or more computer-vision systems, a strategy for picking up items from the bin is determined. When no strategies with high probability of success exist, the robotic device may perturb the contents of the bin to create new available pick-up points.

19 Claims, 5 Drawing Sheets (52) U.S. Cl.
CPC . *B25J 15/0658* (2013.01); *G05B 2219/39508* (2013.01); *G05B 2219/40014* (2013.01); *G05B 2219/40053* (2013.01); *G05B 2219/45063* (2013.01)

(58) Field of Classification Search
CPC ........... G05B 2219/40014; G05B 2219/40053; G05B 2219/45063; G06N 3/08; G06N 3/0454; G06N 3/0472
See application file for complete search history.

(56) References Cited

U.S. PATENT DOCUMENTS

| | | | |
|---|---|---|---|
| 2010/0092032 | A1 | 4/2010 | Boca |
| 2011/0098859 | A1* | 4/2011 | Irie ........................ B25J 9/1687 901/31 |
| 2011/0223001 | A1 | 9/2011 | Martinez et al. |
| 2015/0039129 | A1* | 2/2015 | Yasuda .................. B25J 9/1633 700/258 |
| 2017/0136632 | A1* | 5/2017 | Wagner ..................... B07C 5/36 |
| 2019/0070734 | A1 | 3/2019 | Wertenberger et al. |
| 2019/0071261 | A1 | 3/2019 | Wertenberger et al. |
| 2019/0213481 | A1 | 7/2019 | Godard et al. |
| 2020/0013176 | A1 | 1/2020 | Kang et al. |
| 2020/0017317 | A1 | 1/2020 | Yap et al. |
| 2020/0156266 | A1* | 5/2020 | Curhan ................ B25J 15/0658 |
| 2021/0069904 | A1* | 3/2021 | Duan ................... B25J 15/0658 |
| 2021/0237266 | A1* | 8/2021 | Kalashnikov .......... B25J 9/1602 |
| 2022/0032463 | A1* | 2/2022 | Schneider .............. B25J 9/1679 |

OTHER PUBLICATIONS

Chang, L, et al., "Interactive singulation of objects from a pile," May 2012, 2012 IEEE International Conference on Robotics and Automation, pp. 3875-3882 (Year: 2012).*

Gupta, M, et al., "Using Manipulation Primitives for Object Sorting in Cluttered Environments," Apr. 2015, IEEE Transactions On Automation Science and Engineering, vol. 12, No. 2, pp. 608-614 (Year: 2015).*

Danielczuk, M, et al., "Mechanical Search: Multi-Step Retrieval of a Target Object Occluded by Clutter," Mar. 2019, arXiv: 1903.01588v1, pp. 1-9 (Year: 2019).*

Zeng, A, "Learning Synergies between Pushing and Grasping with Self-supervised Deep Reinforcement Learning," Sep. 2018, arXiv:1803.09956v3, pp. 1-0 (Year: 2018).*

Alonso, Marcus; Current Research Trends in Robot Grasping and Bin Picking; International Joint Conference SOCO, Jun. 7, 2018; 10 pages.

Anas, Essa; Scene Disparity Estimation with Convolutional Neural Networks; SPIE, vol. 11059 Jun. 21, 2019; 9 pages.

Andy Zeng, et al; Robotic Pick-and-Place of Novel Objects in Clutter with Multi-Affordance Grasping and Cross-Domain Image Matching; 2018 IEEE International Conference on Robotics and automation; May 1, 2018; 11 pages.

International Preliminary Report on Patentability for PCT Application No. PCT/US2020/049702; dated Mar. 17, 2022; 13 pages.

International Preliminary Report on Patentability for PCT Application No. PCT/US2020/049703; dated Mar. 17, 2022; 12 pages.

International Preliminary Report on Patentability for PCT Application No. PCT/US2020/049704; dated Mar. 17, 2022; 9 pages.

International Preliminary Report on Patentability for PCT Application No. PCT/US2020/049705; dated Mar. 17, 2022; 10 pages.

International Search Report and Written Opinion for PCT/US2020/049702, filed Sep. 8, 2020, dated Dec. 4, 2021; 19 pages.

International Search Report and Written Opinion for PCT/US2020/049704, filed Sep. 8, 2020; dated Dec. 4, 2020; 16 pages.

International Search Report and Written Opinion for PCT/US2020/049705, filed Sep. 8, 2020, dated Dec. 9, 2020; 18 pages.

Laga, Hamid; A Survey on Deep Learning Architectures for Image-based Depth Reconstruction; Jun. 14, 2019; 28 pages.

Levine, Sergey, Learning Hand-Eye Coordination for Robotic Grasping with Deep Learning and Large-Scale Data Collection; ARVIX, vol. 1603.02199, Apr. 2, 2016; 12 pages.

Matthew Matl, et al.; "Learning Robotic Grasping Policies for Suction Cups and Parallel Jaws in Simulation", Aug. 16, 2019; https://www2.eecs.berkeley.edu/Pubs/TechRpts/2019/EECS-2019-119.pdf; 58 pages.

Olson, Elizabeth A.; Synthetic Data Generation for Deep Learning of Underwater Disparity Estimation, OCEANS 2018 MTS/IEEE; Oct. 22, 2018; 6 pages.

Renaud Detry et al: "Generalizing grasps across partly similar objects", Robotics and Automation (ICRA), 2012 IEEE International Conference On, IEEE, May 14, 2012, 7 pages.

Shao, Quanquan, et al.; Suction Grasp Region Prediction Using Self-supervised Learning for Object Picking in Dense Clutter, 2019 IEEE 5th International Conference on Mechatronics System and Robots; May 3, 2019; 6 pages.

Shehan Caldera et al: Review of Deep Learning Methods in Robotic Grasp Detection, Multimodal Technologies and Interaction, vol. 2, No. 3, Sep. 7, 2018; 24 pages.

International Search Report and Written Opinion for PCT/US2020/049703, filed Sep. 8, 2020, dated Dec. 4, 2021; 17 pages.

* cited by examiner

SYSTEMS AND METHODS FOR ROBOTIC PICKING AND PERTURBATION

CROSS-REFERENCE TO RELATED APPLICATIONS

This application is related to and claims priority to U.S. Provisional Patent Application No. 62/897,282, entitled "APPLICATION FOR PATENT," filed on Sep. 7, 2019 and to U.S. Provisional Patent Application No. 62/897,428, entitled "APPLICATION FOR PATENT," filed on Sep. 7, 2019, which are incorporated by reference herein in their entirety.

TECHNICAL FIELD

Various embodiments of the present technology generally relate to the field of robotic devices and artificial intelligence. More specifically, embodiments include a robotic device for picking and perturbing items in a bin.

BACKGROUND

The field of robotics has grown drastically in recent decades. Robots can be physical machines capable of carrying out certain computer programs to perform tasks. Robots and similar manipulator systems are commonly used in many commercial and industrial settings for precise or repetitive movements. Robots may be used to pick and place parts, weld, access locations too difficult or unsafe for humans to reach, and assist humans in many other applications.

In order for a machine to perform in a truly useful manner, it should be able to sense or perceive at least some aspects of what's going on around it and apply that knowledge to future decisions. Machines solely programmed to repeat a task or action, encounter issues or frequently get stuck, thus requiring human intervention and sometimes defeating the purpose of having a robot at all. Robots and machines are often guided with some level of computer vision. Computer vision allows a system to gain an understanding of its environment from digital images, videos, scans, and similar visual mechanisms. High-level vision systems must be used such that a machine can accurately acquire, process, and analyze data from the real world. Machine learning techniques allow a machine to receive input and generate output based on the input. Some machine learning techniques utilize deep artificial neural networks having one or more hidden layers for performing a series of calculations leading to the output.

Artificial neural networks, modeled loosely after the human brain, learn mapping functions from inputs to outputs and are designed to recognize patterns. A deep neural network comprises an input layer and an output layer, with one or more hidden layers in between. The layers are made up of nodes, in which computations take place. Various training methods are used to train an artificial neural network that uses optimization to continually update weights at the various nodes based on failures until a satisfactory model is achieved. Many types of deep neural networks currently exist and are used for a broad variety of applications and industries including computer vision, series forecasting, automated driving, performing medical procedures, aerospace, and many more. One advantage of deep artificial neural networks is their ability to learn by example, rather than needing to be specifically programmed to perform a task, especially when the tasks would require an impossible amount of programming to perform the operations they are used for today.

The information provided in this section is presented as background information and serves only to assist in any understanding of the present disclosure. No determination has been made and no assertion is made as to whether any of the above might be applicable as prior art with regard to the present disclosure.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments of the present technology generally relate to robotic devices and artificial intelligence. More specifically, some embodiments relate to a robotic device for picking items from a bin and perturbing items in a bin. Perturbation may be performed when no picking options exist with reasonable probabilities of success. The robotic device includes one or more picking elements and one or more perturbation elements. In some embodiments the robotic device is a robotic arm having the picking elements and the perturbation elements coupled to the robotic arm. A picking element may be used to pick up items in the bin. A perturbation element may be used to rearrange the objects in the bin such that better picking options become available. One specific implementation of a perturbation element can blow high-pressure air in a desired direction. A picking element might also constitute a perturbing element, as it can be used to enter in contact and directly re-orient the items, even when they cannot be picked successfully. In some implementations, the robotic device may include or more computer-vision systems.

In an embodiment of the present technology, an apparatus for the picking and perturbation of objects comprises picking elements configured to pick up an object from an area, perturbation elements configured to either blow high-pressure air into the area or re-arrange the objects through contact, and a robot, coupled to the picking elements and the perturbation elements, wherein the robot is configured to move and position the picking elements and the perturbation elements for various tasks.

In another embodiment, a method of operating an apparatus for the picking and perturbation of objects includes receiving image data from a computer-vision system. The image data comprises information related to one or more objects in a bin. The method further includes identifying one or more distinct objects in the bin based on the image data, identifying one or more locations on at least one object from which the object could be pick up by, and identifying an object to attempt to pick up based on the probability of being able to pick up the object. Finally, the method includes attempting to pick up the object at a determined location on the object.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Robots may be programmed to perform a variety of tasks, including grasping, picking, and moving. However, with traditional programming methods, a robot must be instructed what to do for every single movement with code. While robots continue to grow and replace repetitive, laborious, unsafe, or otherwise undesirable human tasks, they continually fall short of performing tasks that cannot be directly coded into a program and require at least some level of intuition. An intelligent robot may be able to perceive and perform more like a human would through various learning techniques, rather than following pre-programmed trajectories.

An autonomous robot should be able to perceive and recognize the environment around it and process that information to come up with a way to perform a task. Thus, if a robot is picking items out of a bin, it should be able to sense the location and position of a specific item and apply that to determine how to pick up the item and move it to a desired location. A robot capable of sensing and applying that knowledge, even within highly repetitive settings, dramatically decreases the need for human intervention, manipulation, and assistance. Thus, human presence may no longer be required when items aren't perfectly stacked or when a robot gets stuck, as a few examples. If a robot regularly gets stuck, it may defeat the purpose of having a robot altogether, because humans may be required to frequently assist the robot.

Furthermore, robots already designed to complete industrial or commercial tasks, such as robots configured to pick items out a bin, face many issues. Even with the most advanced robotic arms and the ability to sense and make decisions, robots fall short of completing tasks such as picking every item out of a bin for various reasons. Challenges include awkwardly shaped items, difficult spots or locations to reach within a bin (such as corners), a variety of item materials and sizes, and similar challenges or unknowns. In order to accurately guide a robotic system, advanced computer vision systems are required. A computer vision system should be able to provide a system with high-quality visual information that can be used to understand depth, geometries, distinct shapes or items, material properties, and more. Furthermore, each gripper presently used by robotic arms has some weaknesses in which it may not be able to grip certain items in certain situations. The infinite number of possible arrangements render it nearly impossible to guarantee that a robot would be able to pick up every single item in a bin every time. Based on the variety of challenges faced by present day robots, a new technique for picking and perturbing items in a bin with a robotic device is disclosed.

Thus, various embodiments of the present invention generally relate to a robot for performing tasks in addition to the systems and methods that control and train the robot. More specifically, some embodiments include a robot for intelligently perturbing and picking items out of a bin. A robot for picking items out of a bin, in accordance with some embodiments of the technology, comprises two types of effectors: picker elements and perturbation elements. As previously mentioned, advanced machines for picking items from a bin, such as a robotic arm, can be very proficient at picking up most items, but fall short of being able to pick every item from a bin, in every position, every single time. This may be due, in part, to physical constraints or limitations in the design of a machine that cause certain angles and locations to be difficult to access. These limitations are also due to the wide variety of materials and positions an item may be in. Thus, in addition to the picker elements that can pick items out of a bin and move them to a new location, perturbation elements are included on the robotic device. In certain embodiments, the robotic device is a robotic arm having a suction-based picking element that also constitutes a perturbation element, and an additional high-pressure air-based perturbation element.

The perturbation elements, in accordance with the present technology, perturb a present arrangement of items within a bin. Each perturbation element in the robotic device may be able to perturb the scene in several manners, or strategies. In certain implementations, the perturbation element is a compressed air valve. The robot may use the compressed air valve to blow high-pressure air into a bin in order to rearrange one or more items in the bin. By perturbing the items in the bin, the items may move such that they can then be picked up from a different position. Perturbation may occur in a general or targeted manner. For example, in a general perturbation strategy, the robot may blow compressed air into the bin continuously, following a trajectory around the edge of the bin. In this manner, most or all of the items in the bin may move as a result of being blown around by the compressed air. After the perturbation is complete, the robot may then re-assess the arrangement of items in the bin and re-attempt to pick up an item. In other implementations, the perturbation element may be used without being coupled to a picking element. In such cases, the perturbation element may be useful for perturbing objects for purposes other than picking.

Alternatively, the robot may perturb an item in a bin in a targeted manner. In a targeted perturbation strategy, the robot may blow compressed air, in a discrete or continuous manner, or physically touch an item, in order to perturb the specific item in a specific or non-specific way. For example, if a marker is standing upright in the corner of a bin, many types of picking elements may struggle to grab the marker due to its position. Thus, the blowing perturbation element could be used in a targeted strategy, blowing air on the side of the marker to try to knock the marker down onto its side to make it easier to pick up. If the perturbation strategy successfully knocks down the marker, the robot can then re-try to pick up the marker. If the applied perturbation strategy fails to knock down the marker, because the targeted air blow strategy only pushed it towards the corner, for example, the robot device might use the same or another perturbation element to try an alternative strategy. In a different attempt, the same perturbation element may blow compressed air behind the marker into the back corner to get the marker to fall down or move away from the corner. If the perturbation strategy succeeds at moving the marker, it could then re-try to pick up the marker. If the perturbation strategy fails to move the marker, it may try another perturbation strategy. For example, it could use the tip of the gripper as another perturbation element to enter in contact with the top points of the marker and pull it towards the center of the bin, or in the direction that is more likely to make it topple down, hence exposing better grasp areas for future picking attempts. If this strategy also fails, in yet another perturbation attempt, the blowing perturbation element may take a general, non-targeted strategy wherein it continuously blows air around the inner perimeter of the bin. In this way, the perturbation element may effectively disturb the position of the marker through the general perturbation, and subsequently re-try to pick up the marker.

The machine may continue to attempt perturbing and picking up the marker in this manner until it succeeds. The perturbation techniques and strategies may exclude any mentioned approaches and methods, or may include additional approaches and methods, such as stirring, as one example. The order of operations in the previous example are presented solely for the purpose of explanation and are not intended to limit the actual series of operations, limit the number of steps, or limit the types of perturbation approaches. The actual order of operations may vary, including but not limited to having fewer steps, having additional steps, having additional methods, having different orders of steps and methods, or similar variations thereof.

The picking element may comprise one or more different types of picking mechanisms including but not limited to a pinching mechanism, a gripping mechanism, a grabbing mechanism, a robotic hand, a parallel plate mechanism, a suction or vacuum mechanism, a magnet or a magnetic mechanism, or similar mechanisms capable of picking items. In an exemplary embodiment of the present technology, a robotic arm comprises a suction mechanism for picking items from a bin (i.e., the picking element, as well as a perturbation element) and a compressed air valve for perturbing elements in the bin (i.e., another perturbation element). Although the suction mechanism can pick up objects of many different shapes, sizes, orientations, and materials, it may still not be able to pick up certain items due to positional limitations, material limitations, and similar item or device-related limitations. Thus, the perturbation elements may reposition objects, via compressed air or touch, such that picking can be achieved.

For example, if the picking device (i.e., the robotic arm and suction element) needs to pick up a pair of socks from a bin, it may not be able to directly pick the socks because their porous fabric does not enable a vacuum to form between them and the suction element. However, the socks may include a tag attached to them that the picker could successfully grab with the suction element. Thus, if the tag is showing, the machine may recognize that it should attempt to pick up the socks by their tag and proceed to do so. If the attempt fails, or if the tag is not accessible to the machine, the machine may initiate a perturbation sequence. For example, the machine may recognize, due to the position of the socks, that blowing a targeted pulse of compressed air towards the socks is most likely to successfully perturb the socks. The machine would therefore attempt the determined perturbation. After the perturbation attempt, the machine reassesses the bin for items that it might be able to successfully pick up. If the tag of the socks is showing, the machine may re-try to pick up the socks using the suction element to grab the tag. If the attempt is successful, the machine can move on to another item with the next highest probability of picking success. If the attempt is unsuccessful, the machine may move on to another item in the meantime or re-initiate a perturbation sequence. The perturbation sequence may be a similar technique to the first attempt, or may be a different technique, such as a general bin perturbation or using the tip of the suction element to contact and push or pull the sock.

In some embodiments, the machine may follow a predetermined series of steps when assessing bin arrangement, determining which items to attempt to pick, determining likelihood of success, determining how to pick an item, determining when and how to perturb an item or items, or additional steps. In alternative embodiments, the machine may make decisions on the most appropriate series of steps for each situation, rendering each sequence subject to be partially or entirely different from a previous sequence or any exemplary sequences provided herein.

The technology described herein should not be limited to picking and perturbing items in only bins. The present technology has many applications in which a mechanism for picking and perturbating items or objects is useful. In some examples, the robotic device described herein may be used to pick and perturb items within any region accessible to the robotic device such as flat surfaces, conveyor belts, piles of items, and other locations or scenarios. The region may comprise walls or barriers, similar to a bin, or may not comprise any defined boundaries. In some examples, the robotic device herein may be used to pick and perturb items in an area similar to a bin such as a tub, a box, a bucket, a crate, a bed, or similar regions to those listed. A bin is used in many examples included herein for purposes of explanation and clarity, but the present technology is useful for many other types of regions and those uses are anticipated.

Figure 1:
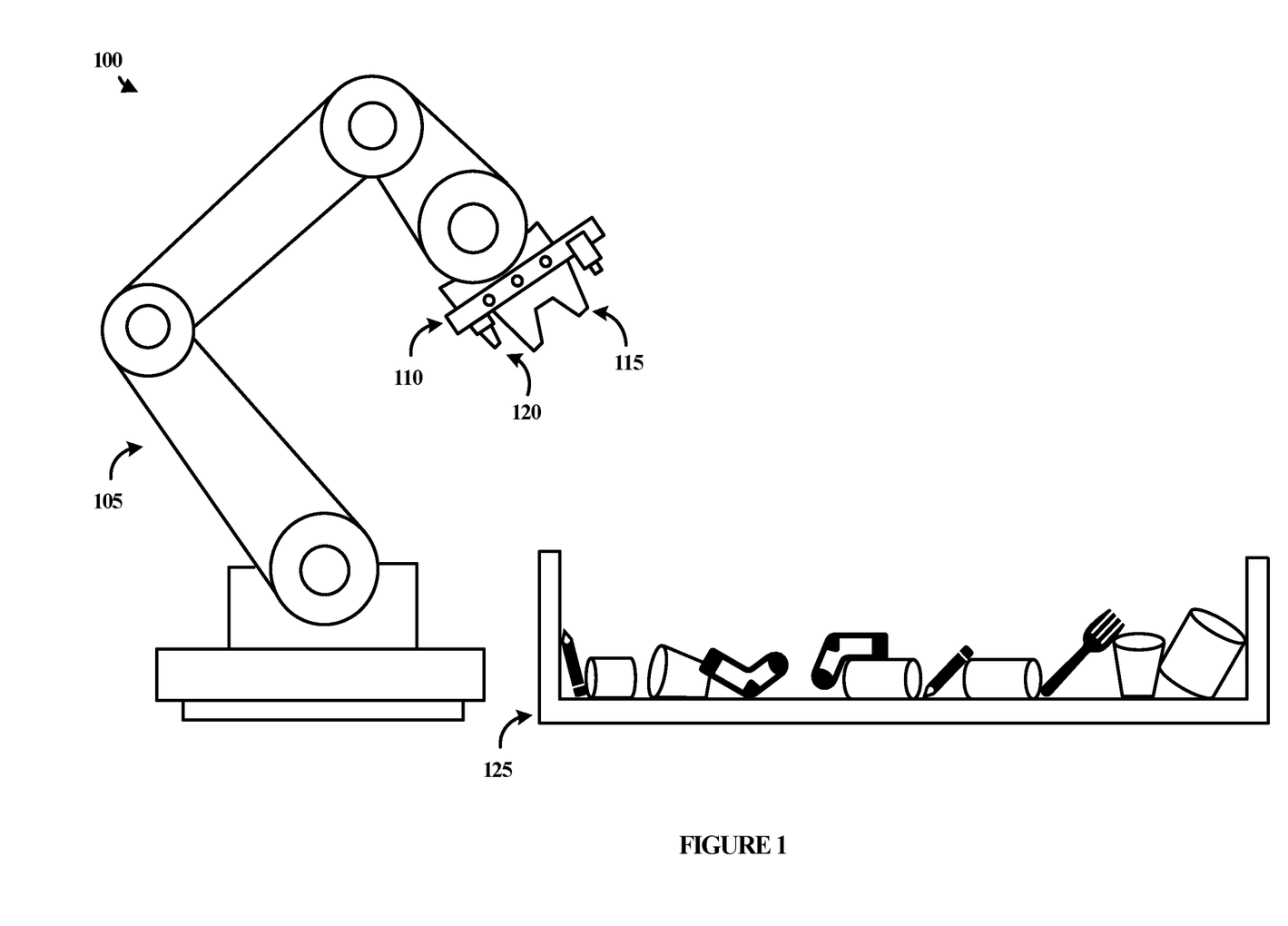
FIG. 1 illustrates an example of a robotic arm for picking and perturbing items in a bin in accordance with some embodiments of the present technology.

FIG. 1 illustrates an example of commercial environment 100 having a robotic arm for picking and perturbing items in a bin in accordance with some embodiments of the present technology. FIG. 1 includes robotic arm 105 and bin 125. Robotic arm comprises vision system 110, picking element 115 that can also be used as a perturbation element, and another perturbation element 120. Bin 125 is holding a variety of items that may be found in a warehouse, commercial setting, or other industrial setting including pencils, cans, cups, socks, and utensils. Many other types of items may be in a bin for picking in accordance with the present disclosure. In the present example, robotic arm 105 is a six-degree-of-freedom (6DOF) robotic arm. Picking element 115 and perturbation element 120 are designed for picking all the items out of bin 125 and moving them to a different location. In certain implementations, the robotic arm may pick each item one at a time and sort the items into their respective, sorted locations.

Picking element 115 may comprise one or more picking mechanisms for grabbing items in bin 125. Picking mechanisms may include a suction mechanism, a gripping mechanism, a robotic hand, a pinching mechanism, a magnet, or any other picking mechanism that may be used in accordance with the present disclosure. In some examples, picking element 115 may additionally be used as a perturbation element, performing actions such as poking, touching, pushing, pulling, stirring, or otherwise moving any items in bin 125, as just a few examples. Robotic arm 105 may move and position picking element 115 such that it is able to pick up an item in bin 125. In certain embodiments, determining which item to pick up and how to pick it up is determined using a deep artificial neural network. The deep neural network (DNN) may be trained to guide item pick-up and determine which items have the greatest probabilities of pick-up success. In other embodiments, picking may be guided by a program that does not use a DNN for decision making.

Perturbation element 120, in the present example, is a pneumatic air valve connected to a pneumatic air supply, wherein the pneumatic air valve blows compressed air into bin 125 in certain situations. Perturbation element 120 may be used in situations where the DNN or another model determines that there is low probability that it will be able to pick up any items in bin 125 with picking element 115 as they are presently arranged. In some examples, the robotic arm may have already tried and failed to pick every visible item in the bin, and therefore decides to initiate a perturbation sequence. Perturbation may be conducted in a general or targeted manner as well as in a continuous or discrete manner. During perturbation, perturbation element 120 may disturb the present arrangement of items in bin 125 by blowing compressed air into bin 125. Compressed air may be blown into a specific spot of bin 125 in an attempt to move a specific item. Compressed air may otherwise be blown into the entire bin in a generic pattern, at a random spot in the bin, or in any other manner that may disturb the present arrangement of items.

Vision system 110 may comprise any number of visual instruments, such as cameras or scanners, in order to guide motion, picking, and perturbation. Vision system 110 receives visual information and provides it to a computing system for analysis. Based on the visual information provided by vision system 110, the system can guide motions and actions taken by robotic arm 105. Vision system 110 may provide information that can be used to decipher geometries, material properties, distinct items, bin boundaries, and other visual information related to picking items from a bin. Based on this information, the system may decide which item to attempt to pick up and can then use vision system 110 to guide robotic arm 105 to the item. Vision system 110 may also be used to decide that items in the bin should be perturbed in order to provide a higher probability of picking success. In the present example, vision system 110 is mounted to robotic arm 105. However, vision system 110 may be in any other location that it can properly view bin 125 from, either on or off of robotic arm 105. In some examples, visions system 110 may be mounted to a stationary component from which it can view bin 125, separate from the robotic device.

Figure 2:
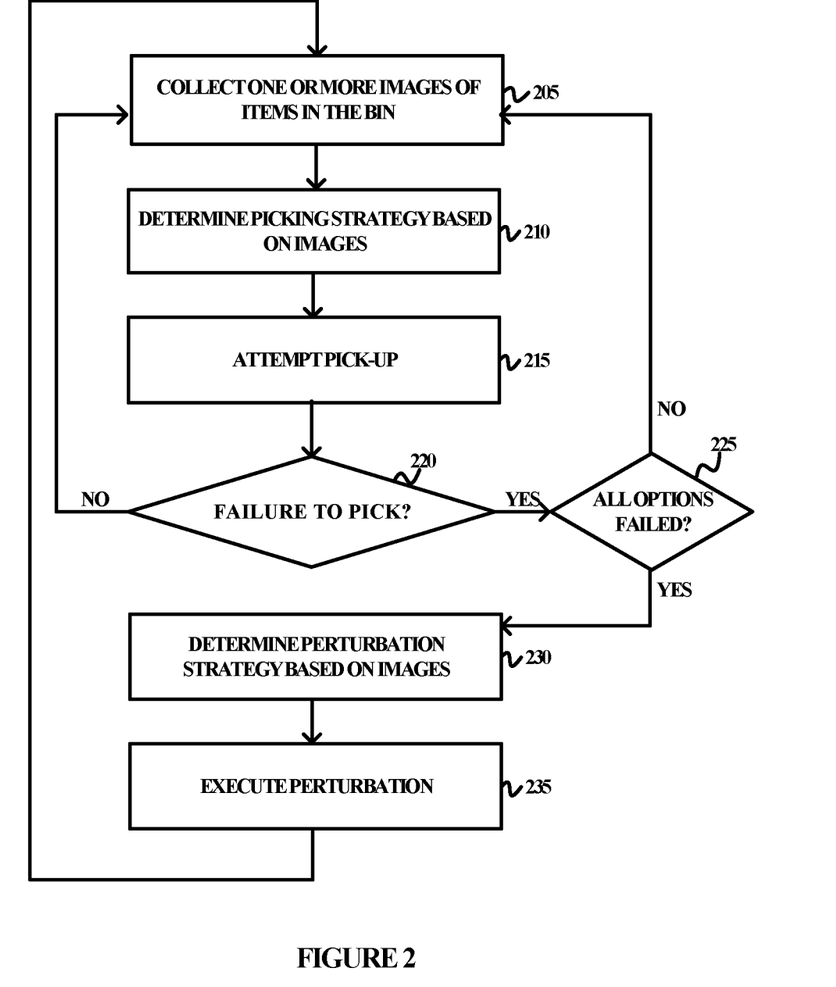
FIG. 2 is a flow chart illustrating an exemplary series of operations for picking and perturbing items in a bin in accordance with some embodiments of the present technology.

FIG. 2 is a flowchart illustrating an exemplary set of operations that a machine may use to pick items from a bin in accordance with some embodiments of the present technology. In step 205, the machine collects one or more images of the contents of the bin. The machine may use visual sensing, imaging, scanning, or any other type of computer-based vision helpful for identifying items in the bin. In some examples, the machine takes one or more images using at least one camera to see the arrangement of items in the bin. The machine may use a 3D camera, a red-green-blue (RGB) camera, a similar camera, or variations or combinations thereof to image the contents of the bin. In the present example, the machine comprises a 6DOF robotic arm having a vacuum element and a compressed air valve.

In step 210, the machine uses data collected in step 205 to determine a picking strategy. The picking strategy may be chosen based on the number of items in the bin, material properties of items in the bin, the arrangement of items in the bin, or similar qualities or combinations thereof. Based on these qualities, the probability of success for picking up various items and a picking strategy for each item can be determined. The picking strategy may include the order of items to be picked up, how each item is picked up, where on each of the items to pick them up from, direction or orientation from which to pick them up, or variations and combinations thereof. The proposed picking strategy may include any movement or position within the 6DOF range of the robotic device.

Once a picking strategy has been determined, the machine attempts to pick up an item in step 215. The attempt is based on the picking strategy determined in step 210. If the robotic arm successfully picks the item, it may move the item to another location according to the needs of the scenario. The machine may then attempt to pick the next item, in some examples. In step 220, the machine determines if it failed to pick up the item. The machine may recognize that an item was not picked based on failure to create a vacuum from not picking the item at all, from loss of vacuum if the item was dropped, or another factor based on the picking method being used. If the machine determines that the item was not successfully picked up and moved, it may then determine if all options in the bin have been exhausted (step 225). If there are remaining viable options for pick up, the machine may return to step 215 and attempt to pick up a different item. If there are no more good options to try to pick up, the machine may move to step 230. After determining if the machine failed to pick up the item or not, information related to the attempt may be stored in memory to be used in future decision making or attempts. Information may be stored based on a failed attempt or a successful attempt. The information may then be accessible for use on the next attempt or may be used to reason about what action to perform next, in some examples.

In step 230, the machine determines a perturbation strategy based on images. The images may be the same images used in step 205 or may be a new set of images collected specifically for the perturbation analysis. The data may similarly be collected via a camera or similar sensing or imaging methods as previously discussed. Based on the images, the machine may use information related to the relative positions of items, the number of items, the material properties of items, or other qualities relevant to perturbation methods and combinations thereof. The machine may pick a perturbation strategy such as a targeted or general strategy, continuous or discrete, physical touch or compressed air, and similar options relevant to perturbation. The machine may use its robotic arm to blow air into the bin, stir the bin, knock items down, touch items, or use similar disturbance or perturbation methods or combinations thereof. After determining the perturbation strategy that the machine will use, the machine executes the perturbation strategy in step 235. The machine may subsequently return to step 205 after perturbation, in some examples. After perturbing the arrangement in the bin, information related to the attempt may be stored in memory to be used in future perturbations. The information may then be accessible for use on the next attempt or for future decision making. For example, the perturbation strategy may be stored such that it can correlate failure or success in the next round of picking with the perturbation strategy or may be used to reason about what action to take next.

In some scenarios, choosing a picking or perturbation strategy is based on pre-defined protocols. In this manner, the machine may be able to try a series of different methods until it is successful. The pre-determined protocols may be used based on the various inputs such as images. In these approaches, a general set of logic controls may be used to determine what strategy to try next. However, in some embodiments choosing a picking or perturbation strategy may be based on machine learning techniques. The machine learning techniques may be implemented within numerous parts of the robotic picking and robotic perturbation process. Deep neural nets may be implemented and trained for the purposes of determining when, where, what, and how the effectors (i.e., the picker element and the perturbation element) pick and perturb items. Using deep neural nets for the purposes of generating effector logic may allow the machine to adapt to any situation, arrangement, item type, and other scenarios by learning from previous failures and continually improving or refining the techniques used. Reinforcement learning, imitation learning, supervised learning, un-supervised learning, and any other types of machine learning or combinations thereof may be used for operating the machines and methods described herein.

Figure 3:
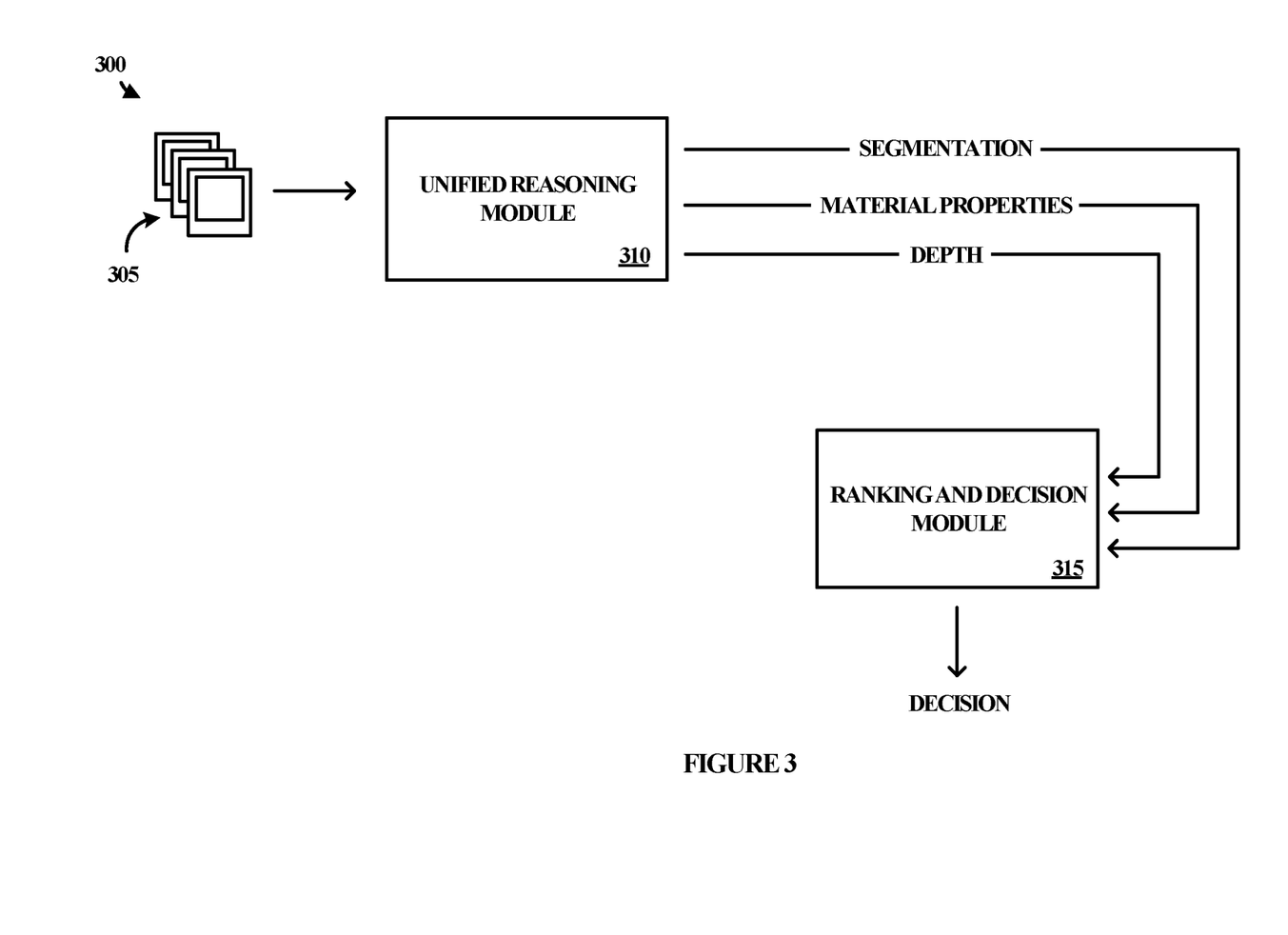
FIG. 3 illustrates an image processing and reasoning environment for guiding a robot to pick up items from a bin in accordance with some embodiments of the present technology.

FIG. 3 illustrates an example flow within environment 300 in accordance with some embodiments of the present technology. In the present example, images 305 are input to and processed in unified reasoning module 310. Images 305 may be one or more images taken by an imaging or computer-vision system. In the present example, the picking and perturbation machine comprises a 6DOF robotic arm. Coupled to the 6DOF robotic arm is at least one camera, a suction valve (i.e., vacuum), and a compressed air valve. Images 305, in the present example, are collected by at least one camera coupled to the 6DOF robotic arm, as is exemplified in FIG. 1. The images are processed in unified reasoning module 310. In some examples, unified reasoning model comprises at least one deep neural network trained for analyzing images. In the present example, image analysis includes performing segmentation, deciphering material properties, and determining distances. However, fewer or additional image analysis processes may be included in unified reasoning module 310 and are anticipated.

Segmentation includes deciphering distinct objects in images 305. Segmentation may include a variety of sub-processes to assist in finding distinct objects. Understanding material properties of each distinct object may then be important for understanding the limitations regarding how an item can be picked up. Understanding the depth of each object may assist in segmentation and may also assist when it is time to approach and pick up an item with the robotic device. Although segmentation, material properties, and depth are illustrated as individual outputs for the purpose of illustration, the outputs of unified reasoning module 310 may be a single, unified model comprising information related to the various types of data discussed or a variation or combination of the outputted data.

The output or outputs of unified reasoning module 310 serves as input to ranking and decision module 315. Ranking and decision module 315 may process the unified model provided by unified reasoning module 310 to produce a ranking of potential pick-up points. The ranking may include a ranking of items according to probability of successful pick-up and a ranking of points on one item or multiple items according to the probabilities of successful pick-up. In some examples, the different types of rankings may be included in the same list. The ranking model may include one or more deep neural nets that have been trained for ranking the probability of success in pick-up options. The ranking model may provide a set of proposed pick-up strategies including grasps and orientations within the range of the 6DOF robotic arm. Based on the ranking model and proposed pick-up strategies, ranking and decision module 315 decides what to try. Ranking and decision module 315 may then output the decision. Based on the decision, the robotic arm attempts to pick up the specified object at the specified point.

Figure 4:
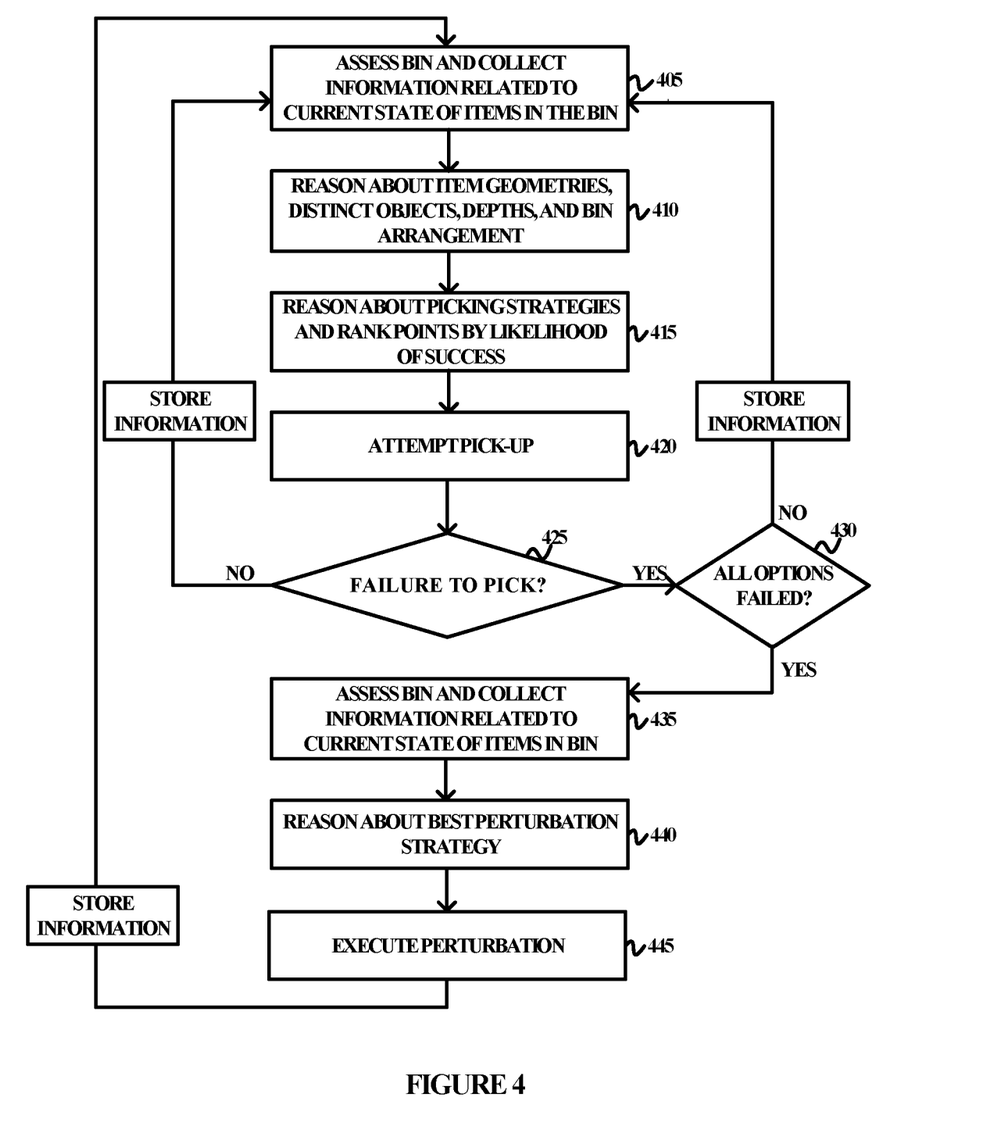
FIG. 4 is a flow chart illustrating an exemplary series of operations for decision-making, picking items, and perturbing items in accordance with some embodiments of the present technology.

FIG. 4 is a flowchart illustrating an exemplary set of operations that a machine may use to pick items from a bin in accordance with some embodiments of the present technology. In step 405, the machine assesses the bin to collect information on the current state of items in the bin. The machine may use visual sensing, imaging, or any other type of sensing helpful for identifying items in the bin. In some examples, the machine takes one or more images using at least one camera to see the arrangement of items in the bin. The machine may use a 3D camera, an RGB camera, or a similar camera or combinations thereof to image the contents of the bin.

In step 410, the machine uses data collected in step 405 to reason about the situation in the bin. In some embodiments, this reasoning includes segmentation. Via segmentation, the machine may reason about or identify distinct objects within the bin. In some examples, segmentation is implemented within a machine learning structure, such as a deep neural net, wherein the machine may learn how to effectively identify distinct objects and subsequently improve at segmentation. After training and over time, the machine may learn from previous failures to continually improve at segmenting out distinct items. During step 410, the machine may further reason about the geometry of distinct objects, the depth or distance of objects with respect to the machine or bin, the material properties of distinct objects, or similar qualities and features including combinations thereof. Similar to segmentation, the machine may comprise an intelligent learning structure that may learn how to effectively reason about the qualities and features mentioned and subsequently improve at identifying them.

In step 415, the machine reasons about the items and points with the highest probability of picking success. Reasoning performed by the machine may be based on knowledge from previous picking experience or attempts. The machine may look for items and for places on the items that have known or learned elements that have historically led to success. For example, referring back to the example of the socks, the machine may search for a flat tag to grab the socks by because it knows from previous experience that the machine is likely to succeed when picking something up by a flat surface. On a given item, the machine may pick a variety of points and reason about which points are better than others for picking up the items up. In certain embodiments, the machine uses a ranking model for both objects and places. Using the ranking model, the machine can rank the items in view by the probability that the machine could successfully pick up each item. Similarly, the machine may rank points on various objects according to the probability of a successful pick-up at that point. Based on the rankings, the machine may produce a set of proposed grasps and orientations to attempt to pick the items. The reasoning performed in step 415 may, similarly to step 410, be implemented in a machine learning structure. Using a trained deep neural net, the machine can learn from previous failures and continually improve at identifying and choosing picking strategies based on the information provided. The grasps and orientations proposed by the machine may be within the full spectrum of motion for the arm, which, in some embodiments, may be a full 6DOF robotic arm comprising a suction-based picking mechanism. As such, a deep neural net may be an effective solution to sorting through the infinite number of possible picking strategies.

In step 420, the machine attempts to pick up an item by the highest ranked (i.e., most promising) point in the bin and move the item to a new location. In some examples, the new location may be a different bin. If the machine is being used to sort items from a bin, the machine may move the item into its corresponding, sorted bin. If the machine successfully picks up the item and moves it to its new location, the machine may continue down the rankings and attempt to pick up an item by the next highest ranked point in the bin.

In step 425, the machine determines if it failed to pick up the item. The machine may be able to sense pick-up failure if it dropped the item or the pick never occurred by determining that a vacuum never formed between the suction element and an item, in the example of the suction-based picking element. If the machine failed to pick up the item, it moves to step 430 to determine if there are more options in the bin to attempt. If there are more options, the machine may attempt to pick up an item by the next highest ranked point. The next highest ranked point may be on the same item or a different item. If every option in the bin has failed (i.e., each item point in the rankings has been attempted), the machine moves on to perturbation. After determining if the machine failed to pick up the item or not, information may be stored related to the last attempt. The information may be then be implemented and used in future attempts.

In step 435, the machine assesses the bin to collect information on the current state of items in the bin. This data may be collected via a camera or similar sensing or imaging method as previously discussed. In step 440, the machine reasons on the best way to perturb the items or a single item in the bin. The machine may pick a perturbation strategy such as targeted or general, continuous or discrete, physical touch or compressed air, and similar options for perturbation. The machine may use its robotic arm to blow air into the bin, stir the bin, knock items down, touch items, or similar perturbation methods, variations, or combinations thereof. Which approach the machine chooses to attempt first may vary depending on the present scenario, previous learning experiences, pre-determined order, or similar protocols. The approach may be based, at least in part, on how many items are left in the bin. Similar to reasoning through steps previously discussed, the reasoning about perturbation strategies may be implemented within a machine learning algorithm. Using a trained deep neural net, the machine may be able to effectively determine a perturbation strategy with the highest likelihood of success based on what it has learned from previous perturbation failures and continually improve its ability to pick perturbation strategies over time.

Finally, in step 445, the machine executes the determined perturbation strategy. In some scenarios, the machine may then return to step 405 and re-assess the present situation within the bin. Alternatively, the machine may return to a different step, such as re-assessing the bin or a specific item in step 435 and trying a different perturbation strategy. After executing the perturbation strategy, information may be stored about the perturbation strategy and executed method. This information may then be implemented and used in future perturbation methods, in some examples.

Several methods of determining depth, including three-dimensional (3D) imaging, exist and can be used in various-computer vision programs that provide an autonomous device or robot the ability to see or sense the environment around it. Imaging methods useful for a robotic device sometimes use triangulation methods for determining depth. Artificial neural networks can be used to guide computer-vision systems. Training data may be used to teach neural networks how to apply 3D information to use geometries, depths, and material properties when guiding decisions and actions taken by a robotic device. 3D cameras or scanners can be used for computer-vision in many applications, however, several other types of cameras or imaging devices can also be used to achieve similar results.

In some examples, a 3D camera may project a known pattern onto a region, such as a bin, in order to determine depth. A 3D camera may take a 3D image of an area and the pattern to produce a 3D image. The 3D image may be a 3D scan or similar type of image comprising 3D data. Other 3D imaging techniques may be used to achieve the resulting 3D information. An alternative method for training a DNN to decipher depth may use simulation. The simulated environment provides many opportunities for training in various situations, multiple views, and performing many training sets at a much faster rate than training with real, physical data sets.

Deep neural networks, such as those used in the picking, perturbation, segmentation, ranking, and computer-vision models described herein, are used to learn mapping functions from inputs to outputs. Generating mapping functions is done through DNN training processes. Many various types of training and machine learning algorithms presently exist and are commonly used including supervised learning, unsupervised learning, reinforcement learning, imitation learning, and many more. During training, the weights in a DNN are continually updated in response to errors, failures, or mistakes. In order to create a robust, working model, training data is used to initially dial in the weights until a sufficiently strong model is found or the learning process gets stuck and is forced to stop. In some implementations, the weights may continue to update throughout use, even after the training period is over, while in other implementations, they may not be allowed to update after the training period.

Training neural networks, in some scenarios, may be the most difficult part of using artificial neural networks. Parameters of a neural network are found using optimization with many, or sometimes infinite, possible solutions. Modern deep learning models, especially for computer vision and image processing, are based on convolutional neural networks, although may also incorporate other deep generative models. As described herein, using artificial neural networks for the picking, perturbation, segmentation, ranking, and computer-vision processes first requires a training process. Most training processes are complex and require a great amount of time. A variety of different training methods may be used to train a robotic arm for intelligently picking and perturbing items in a bin.

The processes described herein may be implemented in several different variations of media including software, hardware, firmware, and variations or combinations thereof. For example, neural net training methods described herein may be implemented in software, while a trained neural net for the picking and perturbation of items may be implemented entirely in hardware and installed in a robotic device. Alternatively, the robotic device may be controlled by a trained neural net implemented entirely in software on an external computing system, or may be implemented as a combination of the two across one or more devices.

Figure 5:
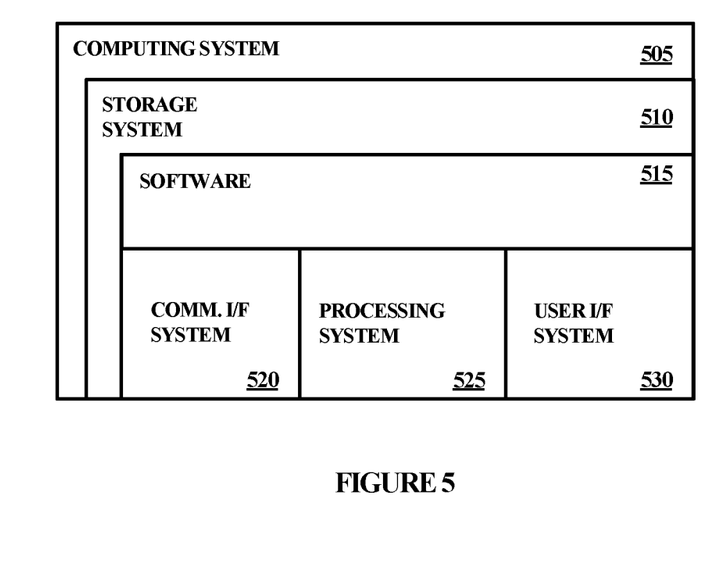
FIG. 5 is an example of a computing system in which some embodiments of the present technology may be utilized.

FIG. 5 illustrates computing system 505 that is representative of any system or collection of systems in which the various processes, programs, services, and scenarios disclosed herein may be implemented. Examples of computing system 505 include, but are not limited to, desktop computers, laptop computers, server computers, routers, web servers, cloud computing platforms, and data center equipment, as well as any other type of physical or virtual server machine, physical or virtual router, container, and any variation or combination thereof.

Computing system 505 may be implemented as a single apparatus, system, or device or may be implemented in a distributed manner as multiple apparatuses, systems, or devices. Computing system 505 may include, but is not limited to, storage system 510, software 515, communication interface system 520, processing system 525, and user interface system 530. Components of computing system 505 may be optional or excluded in certain implementations. Processing system 525 is operatively coupled with storage system 510, communication interface system 520, and user interface system 530, in the present example.

Processing system 525 loads and executes software 515 from storage system 510. Software 515 includes and implements various processes described herein, which is representative of the processes discussed with respect to the preceding Figures. When executed by processing system 525, software 515 directs processing system 525 to operate as described herein for at least the various processes, operational scenarios, and sequences discussed in the foregoing implementations. Computing system 505 may optionally include additional devices, features, or functionality not discussed for purposes of brevity.

Referring still to FIG. 5, processing system 525 may comprise a micro-processor and other circuitry that retrieves and executes software 515 from storage system 510. Processing system 525 may be implemented within a single processing device but may also be distributed across multiple processing devices or sub-systems that cooperate in executing program instructions. Examples of processing system 525 include general purpose central processing units, graphical processing units, application specific processors, and logic devices, as well as any other type of processing device, combinations, or variations thereof.

Storage system 510 may comprise any computer readable storage media readable by processing system 525 and capable of storing software 515. Storage system 510 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 510 may also include computer readable communication media over which at least some of software 515 may be communicated internally or externally. Storage system 510 may be implemented as a single storage device but may also be implemented across multiple storage devices or sub-systems co-located or distributed relative to each other. Storage system 510 may comprise additional elements, such as a controller, capable of communicating with processing system 525 or possibly other systems.

Software 515 may be implemented in program instructions and among other functions may, when executed by processing system 525, direct processing system 525 to operate as described with respect to the various operational scenarios, sequences, and processes illustrated herein. For example, software 515 may include program instructions for implementing a robot control process, decision making process, segmentation process, ranking process, or any other reasoning or operational processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 515 may include additional processes, programs, or components, such as operating system software, robotic control software, computer-vision software, virtualization software, or other application software. Software 515 may also comprise firmware or some other form of machine-readable processing instructions executable by processing system 525.

In general, software 515 may, when loaded into processing system 525 and executed, transform a suitable apparatus, system, or device (of which computing system 505 is representative) overall from a general-purpose computing system into a special-purpose computing system customized for one or more of the various operations or processes described herein. Indeed, encoding software 515 on storage system 510 may transform the physical structure of storage system 510. The specific transformation of the physical structure may depend on various factors in different implementations of this description. Examples of such factors may include, but are not limited to, the technology used to implement the storage media of storage system 510 and whether the computer-storage media are characterized as primary or secondary storage, as well as other factors.

For example, if the computer readable storage media are implemented as semiconductor-based memory, software 515 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 520 may include communication connections and devices that allow for communication with other computing systems (not shown) over communication networks or connections (not shown). Examples of connections and devices that together allow for inter-system communication may include network interface cards, antennas, power amplifiers, radio-frequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 505 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. An apparatus for picking and perturbing items in a bin, the apparatus comprising:
   a picking element, wherein the picking element is configured to pick up an object from the bin;
   a perturbation element, wherein the perturbation element comprises a compressed air valve and is configured to reposition one or more objects within the bin; and
   a robotic arm comprising the picking element and the perturbation element, wherein the robotic arm is configured to:
      move the picking element based on an output of at least one machine learning algorithm such that the picking element can pick up the object from the bin; and
      reposition the one or more objects within the bin by moving the perturbation element and blowing compressed air into the bin according to a perturbation sequences of a plurality of perturbation sequences, wherein the perturbation sequence comprises movement in a plurality of directions relative to the bin and is chosen by at least one different machine learning algorithm trained to receive at least one image of the bin and select the perturbation sequence of the plurality of perturbation sequences based at least in part on an arrangement of the one or more objects within the bin visible in the at least one image.

2. The apparatus of claim 1, wherein the picking element comprises one or more suction cups with which the object can be picked up.

3. The apparatus of claim 1, wherein the picking element comprises one or more gripping components with which the object can be picked up.

4. The apparatus of claim 1 wherein the robotic arm is further configured to, after picking up the object, move the picking element such that the picking element can drop off the object in a new location.

5. The apparatus of claim 1, wherein the robotic arm is a six-degree-of-freedom robotic arm.

6. The apparatus of claim 1, wherein a single component coupled to the robotic arm comprises the picking element and the perturbation element.

7. A method of operating an apparatus for picking items in a bin, the method comprising:
   collecting visual information related to a current state of one or more items in the bin;
   inputting the visual information into one or more machine learning algorithms configured to identify picking strategies;
   performing a first pick up attempt for an item of the one or more items in the bin according to a picking strategy identified by the one or more machine learning algorithms configured to identify picking strategies;
   determining that the first pick up attempt failed;
   in response to determining that the first pick up attempt failed, inputting updated visual information into one or more different machine learning algorithms configured to identify a perturbation sequence based at least in part on an arrangement of the one or more items in the bin, wherein the updated visual information is related to a updated state of the one or more items in the bin after the first pick up attempt;
   repositioning the one or more items in the bin with compressed air from at least one end effector according to the perturbation sequences identified by the one or more different machine learning algorithms, wherein the perturbation sequence comprises movement in a plurality of directions relative to the bin;
   collecting new visual information related to a new state of the one or more items in the bin;
   inputting the new visual information into the one or more machine learning algorithms configured to identify picking strategies; and
   performing a second pick up attempt for the item according to a new picking strategy identified by the one or more machine learning algorithms configured to identify picking strategies.

8. The method of claim 7, wherein performing the first pick up attempt comprises attempting to pick up the item with one or more picking elements of the apparatus.

9. The method of claim 8, wherein the one or more picking elements comprises at least one suction cup configured to pick up items via suction.

10. The method of claim 8, wherein the one or more picking elements comprise the at least one end effector.

11. The method of claim 7, wherein the at least one end effector comprises a compressed air valve that blows air into the bin to reposition the one or more items.

12. The method of claim 7, wherein the at least one end effector comprises a perturbation element configured to reposition the item using physical contact.

13. The method of claim 7, wherein collecting the visual information comprises:
   capturing one or more images using at least one camera;
   identifying a geometry associated with the item; and
   identifying a depth associated with the item.

14. A system comprising:
   one or more computer readable storage media;
   one or more processing systems operatively coupled to the one or more computer readable storage media; and
   program instructions, stored on the one or more computer readable storage media, for directing a robotic device to pick and perturb items, wherein the program instructions, when read and executed by the one or more processing systems, direct the robotic device to:
      collect visual information related to a current state of one or more items in an area;
      input the visual information into one or more machine learning algorithms configured to identify picking strategies;
      perform a first pick up attempt for an item of the one or more items in the area according to a picking strategy identified by the one or more machine learning algorithms configured to identify picking strategies;
      in response to determining that the first pick up attempt failed, input updated visual information into one or more different machine learning algorithms configured to identify a perturbation sequence based at least in part on an arrangement of the one or more items in the area, wherein the updated visual information relates to an updated state of the one or more items in the area after the first pick up attempt;
      reposition the one or more items in the area using compressed air from at least one end effector according to the perturbation sequence identified by the one or more different machine learning algorithms, wherein the perturbation sequence comprises movement in a plurality of directions relative to the area;

collect new visual information related to a new state of the one or more items in the area;

input the new visual information into the one or more machine learning algorithms configured to identify picking strategies; and perform a second pick up attempt for the item according to a new picking strategy identified by the one or more machine learning algorithms configured to identify picking strategies.

15. The system of claim 14, wherein to perform the first pick tip attempt for the item, the program instructions direct the robotic device to attempt to pick up the item with one or more picking elements of the robotic device.

16. The system of claim 15, wherein the one or more picking elements comprises at least one suction cup configured to pick up items via suction.

17. The system of claim 15, wherein the one or more picking elements comprise the at least one end effector.

18. The system of claim 14, wherein the at least one end effector comprises a compressed air valve that blows air into the area to reposition the one or more items.

19. The system of claim 14, wherein the at least one end effector comprises a perturbation element configured to reposition the item using physical contact.

* * * * *

UNITED STATES PATENT AND TRADEMARK OFFICE
CERTIFICATE OF CORRECTION

PATENT NO. : 11,911,903 B2
APPLICATION NO. : 17/014194
DATED : February 27, 2024
INVENTOR(S) : Yan Duan et al.

It is certified that error appears in the above-identified patent and that said Letters Patent is hereby corrected as shown below:

On the Title Page

Item (60) Related U.S. Application Data Section, replace "62/897,428" with --62/897,284--

In the Specification

In Column 1, Line 10, replace "62/897,428" with --62/897,284--

Signed and Sealed this
Nineteenth Day of November, 2024

Katherine Kelly Vidal
*Director of the United States Patent and Trademark Office*